(12) United States Patent
Zong et al.

(10) Patent No.: US 9,826,052 B2
(45) Date of Patent: Nov. 21, 2017

(54) WEB PAGE CONTENT LOADING CONTROL METHOD AND DEVICE

(71) Applicant: BEIJING QIHOO TECHNOLOGY COMPANY LIMITED, Xicheng, Beijing (CN)

(72) Inventors: Xiaobin Zong, Beijing (CN); Weigang Liu, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 112 days.

(21) Appl. No.: 14/368,709

(22) PCT Filed: Dec. 24, 2012

(86) PCT No.: PCT/CN2012/087269
§ 371 (c)(1),
(2) Date: Jun. 25, 2014

(87) PCT Pub. No.: WO2013/097667
PCT Pub. Date: Jul. 4, 2013

(65) Prior Publication Data
US 2014/0379841 A1 Dec. 25, 2014

(30) Foreign Application Priority Data
Dec. 30, 2011 (CN) .......................... 2011 1 0457111

(51) Int. Cl.
*G06F 15/167* (2006.01)
*H04L 29/08* (2006.01)
*G06F 17/30* (2006.01)

(52) U.S. Cl.
CPC .... *H04L 67/2842* (2013.01); *G06F 17/30902* (2013.01); *H04L 67/02* (2013.01)

(58) Field of Classification Search
USPC .......................... 709/213, 217, 218, 219, 223
See application file for complete search history.

(56) References Cited

U.S. PATENT DOCUMENTS 6,879,994 B1 * 4/2005 Matsliach ........... G06F 11/3495
709/204
2001/0037398 A1 * 11/2001 Chao ..................... H04L 1/1809
709/230

(Continued)

OTHER PUBLICATIONS

English translation of Abstract only of Chinese Application No. CN101488135A, Publication date Jul. 22, 2009, country: China, Inventors: Chen Zhao, Title: Designing and acquiring method for delayed personalized web page, one page.

(Continued)

*Primary Examiner* — Liangche Wang
(74) *Attorney, Agent, or Firm* — Polsinelli, PC

(57) ABSTRACT

The invention discloses a web page content loading control method and device. The method comprises: receiving a web page access request; according to the web page access request, reading corresponding pre-stored web page content locally and loading the same; according to the web page access request, obtaining web page content from a server and caching the obtained content locally; and after obtaining the web page content completely or partially, reading the cached content and updating currently loaded web page content.

5 Claims, 3 Drawing Sheets

(56) References Cited

U.S. PATENT DOCUMENTS

| | | | | |
|---|---|---|---|---|
| 2003/0078964 A1* | 4/2003 | Parrella, Sr. | ...... | G06F 17/30902 709/203 |
| 2005/0097221 A1* | 5/2005 | James | ................. | H04L 67/1008 709/239 |
| 2007/0106538 A1* | 5/2007 | Holtermann | ........... | G06Q 40/08 705/4 |
| 2007/0130518 A1* | 6/2007 | Shavit | ................. | G06F 17/2229 715/205 |

OTHER PUBLICATIONS

English translation of Abstract only of Chinese Application No. CN102253941A, Publication date Nov. 23, 2011, country: China, Inventors: Guoliang Zhang et al, Title: Cache updating method and cache updating device, one page.

English translation of Abstract only of Japanese Application No. JP2011-150423A, Publication date Aug. 4, 2011, country: Japan, Inventors: Yano Hironori, Title: Web Browser System and Data Update Method, one page.

English translation of Abstract only of Japanese Application No. JP2003-162472A, Publication date Jun. 6, 2003, country: Japan, Inventors: Nigo Masaki et al, Title: Web Page Browsing Method, Client for Web Page Browsing System and Web Page Browsing Program, one page.

International Search Report regarding PCT/CN2012/087269 dated Apr. 4, 2013, 4 pages.

\* cited by examiner

WEB PAGE CONTENT LOADING CONTROL METHOD AND DEVICE

FIELD OF THE INVENTION

The invention relates to the field of computer application technology, and in particular, to a web page content loading control method and device.

BACKGROUND OF THE INVENTION

A browser is essential tool software for a user to surf the internet daily, and the user may conveniently view various information on the internet by using the browser. The browser interacts with a web page server mainly through the HTTP protocol and obtains web pages, these web pages are specified by URLs, and the most basic file format is usually the HTML and indicated by the MIME in the HTTP protocol. Multiple documents may be comprised in a web page, and each document is obtained from a server respectively. An early web page only contains simple content such as text and static image, etc. whereas a current web page has already become a comprehensive carrier for multiple elements such as text, image, animation, audio/video, etc. The richness of web page content brings about various fresh experiences to a user, and at the same time raises a higher requirement for an apparatus and a network. For example, for multimedia content such as image, audio/video, etc., the data size of such content is significantly larger than that of a text, and in the process of loading a web page, if the bandwidth of a network or the response speed of a server cannot meet the requirements, it will cause the speed of web page loading to be low and severely affect the internet surfing experience of a user.

With respect to the above problems, many existing browsers employ a web page caching technology. For example, the browser Internet Explorer will adopt a cumulative acceleration approach to store web page content (including pictures and cookie files, etc.) a user once accessed in a cache directory of a local computer of the user. Thereafter, each time the user browses a web page, IE will first search this directory, and if there is already accessed content in it, it is unnecessary for IE to obtain the content from a website server, instead, it is retrieved directly from a cache, thereby avoiding occupying a plenty of time and network resources due to re-downloading for each time and improving the speed of web page loading.

However, a problem with the prior art caching technology is that when the web page content is already updated on the server, and yet the browser still reads it directly from a local cache, this will cause that the updated content cannot be displayed timely. Although the user may command the browser to go to the server to obtain newer web page content by an action of "refreshing the page", in the whole process of refreshing the page, the problem that the speed of loading is low will still exist.

SUMMARY OF THE INVENTION

In view of the above problems, the invention is proposed to provide a web page content loading control device and a corresponding web page content loading control method which overcome the above problems or at least in part solve or mitigate the above problems.

According to an aspect of the invention, there is provided a web page content loading control method comprising: receiving a web page access request; according to the web page access request, reading corresponding pre-stored web page content locally and loading the same; according to the web page access request, obtaining web page content from a server and caching the obtained content locally; and after obtaining the web page content completely or partially, reading the cached content and updating the currently loaded web page content.

According to another aspect of the invention, there is provided a web page content loading control device comprising: a request receiving unit configured to receive a web page access request; a preloading unit configured to, according to the web page access request, read corresponding pre-stored web page content locally and load the same; a caching unit configured to, according to the web page access request, obtain web page content from a server and cache the obtained content locally; and a load updating unit configured to, after obtaining the web page content completely or partially, read the cached content and update the currently loaded web page content.

According to yet another aspect of the invention, there is provided a computer program comprising a computer readable code which causes a server to perform the web page content loading control method according to any of claims 1-7, when said computer readable code is running on the server.

According to still another aspect of the invention, there is provided a computer readable medium storing the computer program as claimed in claim 15 therein.

The beneficial effects of the invention lie in that:

According to a technical solution provided by an embodiment of the invention, after receiving the web page access request, on the one hand, pre-stored content is first read locally and loaded in the foreground to guarantee a fast speed of loading; on the other hand, newer web page content is obtained normally in the background from a server and cached, and after obtaining completely or partially, the currently loaded web page content is updated at an appropriate timing. Applying the above scheme, not only the state of page loading being finished can be presented to the user rapidly, but also the updated content of a web page can be obtained automatically without being perceived by the user, and when the user wants to view the up-to-date web page content, it can also be read locally, thereby realizing an improvement on the speed of web page loading in the case of guaranteeing a timely update of the web page content.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

First, a web page content loading control method provided by an embodiment of the invention will be described, which method comprises the following steps:

receiving a web page access request;

according to the web page access request, reading corresponding pre-stored web page content locally and loading the same;

according to the web page access request, obtaining web page content from a server and caching the obtained content locally; and after obtaining the web page content completely or partially, reading the cached content and updating the currently loaded web page content.

The executive body of the above steps may be a web page browser, or other application containing a web page browsing function. Applying the above method, after receiving the web page access request, on the one hand, pre-stored content is first read locally and loaded in the foreground to guarantee a fast speed of loading; on the other hand, up-to-date web page content is obtained normally in the background from a server and cached, and after obtaining, the currently loaded web page content is updated at an appropriate timing. Applying the above scheme, not only the state of page loading being finished can be presented to the user rapidly, but also the updated content of a web page can be obtained automatically without being perceived by the user, and when the user wants to view the up-to-date web page content, it can also be read locally, thereby realizing an improvement on the speed of web page loading in the case of guaranteeing a timely update of the web page content.

For a better understanding of technical solutions in the invention by one skilled in the art, in the following, the technical solutions in embodiments of the invention will be described in detail with reference to the drawings in the embodiments of the invention. Evidently, the described embodiments are just part of the embodiments of the invention, and not all the embodiments. All the other embodiments obtained by one skilled in the art based on the embodiments in the invention should pertain to the protective scope of the invention.

Figure 1:
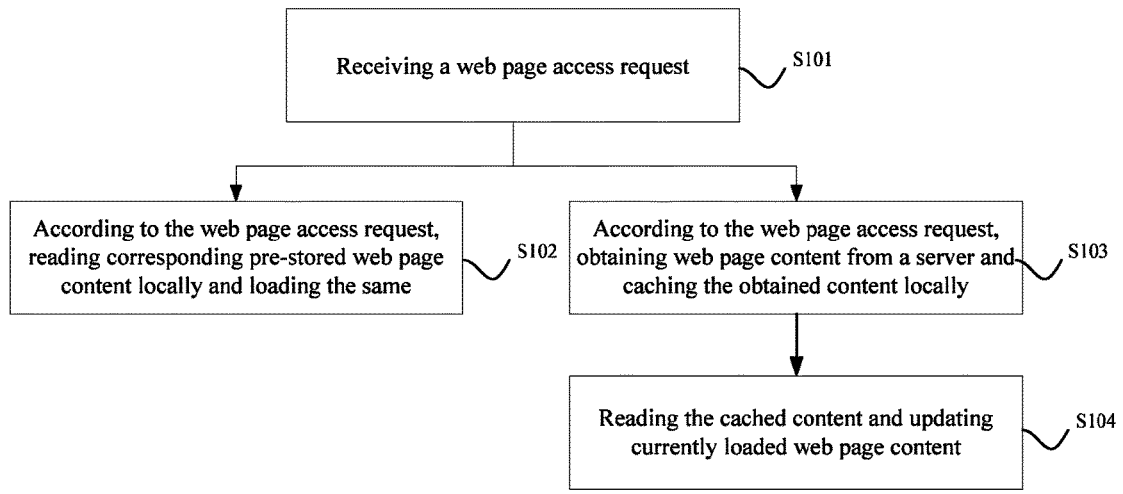
FIG. 1 is a flow chart of a web page content loading control method according to an embodiment of the invention.

What is shown in FIG. 1 is a flow chart of a web page content loading control method of the invention, comprising the following steps.

In S101, receiving a web page access request.

Taking a web page browser as example, generally, a user may submit the web page access request through a number of ways, for example, entering the URL of a web page directly in the browser's address bar, selecting a pre-stored web page label from "favorites", clicking a web page link from other web page or document or program, etc. In some cases, the web page access request may also be triggered by some applications, for example, the home page of a software product is automatically opened after the installation of the software is finished, and so on. In short, the scheme of the invention does not need definition of a particular form of the web page access request.

In S102, according to the web page access request, corresponding pre-stored web page content is read locally and loaded.

In a particular implementation, the corresponding pre-stored web page content may be in a number of forms. For example, it may be that when the user accesses a certain web page at the first time, a picture is grabbed from the web page after the loading of the web page is finished, and saved as web page content corresponding to the page; as such, when the web page is accessed again at a later time, it can show this picture to the user first. Since the picture is saved in a computer of the user locally, and it is suffice to display a kind of picture in the browser directly, and it is unnecessary to draw pixel by pixel, the user can see the picture shown in a window of the browser very soon.

Or, it may also be possible to pre-store the script or HTML (Hypertext Markup Language) code of a web page. In particular, when the user accesses a certain web page at the first time, the browser will first download the web page into a temporary file folder (e.g., the directory Temporary Internet Files of IE) in a local computer, and at this point, the script or HTML code of the web page may be stored; as such, when the user accesses the web page at the second time or the third time, the browser may read the script or HTML code of the web page directly from the temporary file folder in the local computer and load the same. In this way, since the script or code is saved locally and does not need to be downloaded remotely, it is also possible to enable the user to see the web page content in a window of the browser in a short time.

The implementation scheme of the invention is realized by default under the premise that the object web page content to be accessed has been saved locally. Of course, it may be understood that if the browser finds out that the object web page content to be accessed has not been pre-stored locally, then in this loading process it can only go to a server to obtain the web page content, which cannot achieve fast loading. However, after the web page content is obtained from the server, it may be saved, and fast loading may be achieved when it needs to be accessed next time.

It needs to be noted that in this step, the web page content pre-stored locally may make use of web page cache content in a prior art, e.g., the content in the directory Temporary Internet Files of IE, or also may be entirely independent of the existing web page cache.

In an improved embodiment of the invention, in addition to using the prior web page caching technology, other ways may be utilized to realize pre-storage of the web page content. For example, it may be possible to preset a set of object web pages, which may take the form of e.g., a list of websites. According to the set of object web pages, in operation, the browser may not need to be triggered manually by the user, automatically go to the server to obtain content corresponding to an object web page, and save the obtained content.

Therein, the set of object web pages may be specified manually by the user according to access requirements, or may also be generated automatically by the browser itself according to the user's browsing historical behavior, for example, a web page to which the user has accessed with a frequency/number of times greater than a certain threshold is set as an object web page, or web pages to which the user has accessed with a frequency/number of times in the top N are set as object web pages (N is a natural number), and so on. Of course, for a set of object web pages automatically generated, it is also allowed to be modified by the user.

Furthermore, the timing to automatically go to the server to obtain the object web page content may also have several setting ways, such as:

1) During startup or initialization of the browser, the object web page content is obtained automatically from the server. Such an obtaining operation is one-time for a browser active process;

2) According to a preset obtaining updating period T1, up-to-date object web page content is obtained periodically from the server. Therein, the obtaining updating period T1 may be set manually by the user. For example, for some web pages being updated relatively frequently, a shorter obtaining updating period may be set, whereas for some web pages not updated frequently, a longer obtaining updating period may be set, or even it is set as "irregular update". Of course, the obtaining updating period T1 may also be generated automatically according to the user's browsing historical behavior, for example, for a web page which the user has clicked with a higher frequency, a shorter obtaining updating period can be set, whereas for a web page which the user has clicked with a lower frequency, a longer obtaining updating period can be set.

3) According to storage time of web page content in a cache, it is triggered to automatically obtain object web page content from the server. If it is found that the object web page content had already been stored, then the time at which the web page content was stored is judged and compared with the current time. If it is found that the storage time of the web page content in the cache exceeds a certain preset threshold (e.g., 1 hour, 2 hours, 1 day, etc.), then it is considered necessary to update the stored content, and at this point, the operation of obtaining up-to-date web page content from the server is triggered automatically.

It may be understood that, the above several ways of automatically obtaining object web page content may be embodied independently respectively, or may also be embodied after their combination. It is in particular to be noted that, such an operation of obtaining object web page content in the background may also be triggered to be implemented by the user manually. This way of operation is suitable for a situation in which the user is browsing content of a current web page, and at the same time wants that the browser performs a content update in the background, such that fast loading of the updated content can be achieved after the current web page is browsed.

In S103, according to the web page access request, web page content is obtained from the server and the obtained content is cached locally.

The purpose of step S102 is to enable the user to see as soon as possible that the loading of the page is finished, whereas the function of this step is to obtain web page content from a server to guarantee a timely update of the web page content.

In S104, after obtaining the web page content completely or partially, the cached content is read and the currently loaded web page content is updated.

The difference between the invention and the prior art is that, in step S103, while web page content is obtained from the server, it is unnecessary to immediately load the newly obtained content at any time. Instead, after waiting for S103 to obtain the complete web page content, one-time update loading is performed, thereby guaranteeing the user's browsing experience.

In fact, S103 and S102 may be performed in parallel, however, since S102 reads from a local cache, in theory, it must be that preloading will be finished before S103 obtains complete web page content from the server. Yet after the complete web page content is obtained and cached, the content in the cache may be utilized at an appropriate timing to update the currently loaded content. For example, according to a manual trigger of the user, the cached content is read and the currently loaded web page content is updated.

According to a preset load updating period T2, the cached content is read and the currently loaded web page content is updated. This scheme is particularly suitable for the corresponding scheme provided in S102 of automatically going to the server to obtain object web page content. In general, T2 may be set to be no less than T1, otherwise, in case of not going to the server to obtain up-to-date web page content, it is meaningless to update loaded content frequently. Of course, it is unnecessary for an embodiment of the invention to limit a setting way of the load updating period T2.

Figure 2:
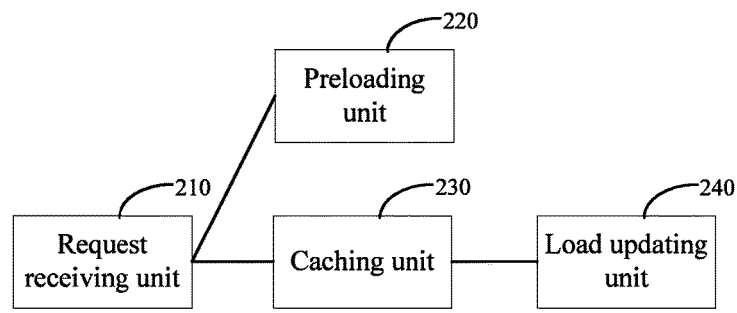
FIG. 2 is a first structural diagram of a web page content loading control device according to an embodiment of the invention.

Correspondingly to the above method embodiment, the invention also provides a web page content loading control device. See what is shown in FIG. 2, the device may comprise:

a request receiving unit 210 configured to receive a web page access request;

a preloading unit 220 configured to, according to the web page access request, read corresponding pre-stored web page content locally and load the same;

a caching unit 230 configured to, according to the web page access request, obtain web page content from a server and cache the obtained content locally; and a load updating unit 240 configured to, after obtaining the web page content completely or partially, read the cached content and update the currently loaded web page content.

Therein, the corresponding pre-stored web page content comprises: a picture of the pre-stored web page content, or a script file of the pre-stored web page, or hypertext markup language HTML code of the pre-stored web page.

Figure 3:
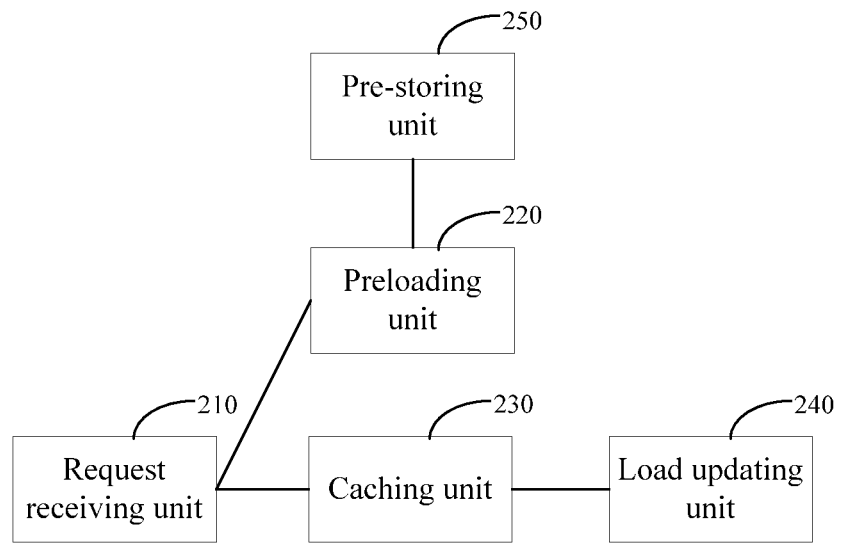
FIG. 3 is a second structural diagram of a web page content loading control device according to an embodiment of the invention.

See what is shown in FIG. 3. A web page content loading control device provided by an embodiment of the invention may further comprise:

a pre-storing unit 250 configured to pre-obtain web page content from a server and store the same locally according to a preset object web page.

Therein, the pre-storing unit 250 may be particularly configured to obtain the up-to-date web page content periodically from the server according to a preset obtaining updating period, Or, obtain the up-to-date web page content from the server in the case of the storage time of the web page content exceeding a preset threshold.

Figure 4:
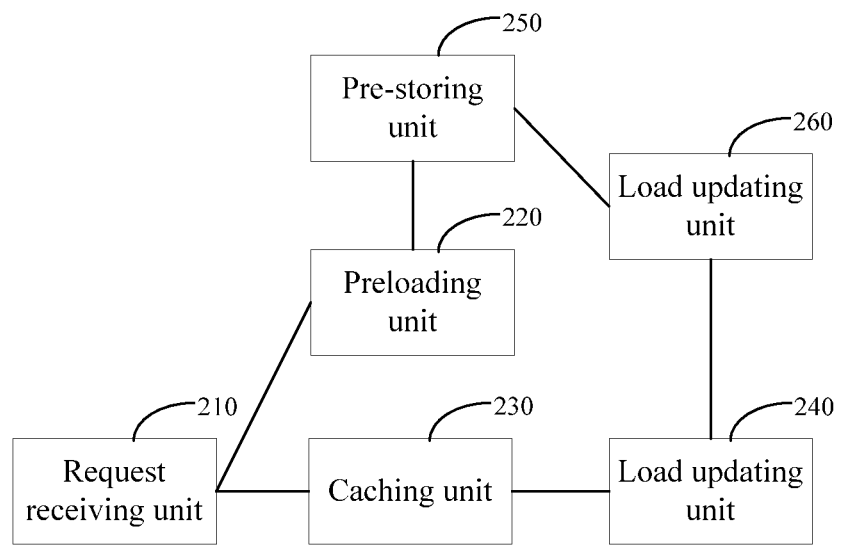
FIG. 4 is a third structural diagram of a web page content loading control device according to an embodiment of the invention.

See what is shown in FIG. 4. A web page content loading control device provided by an embodiment of the invention may further comprise:

an update period determining unit 260 configured to, according to the historical behavior of a user browsing a web page, determine the load updating period of the load updating unit 240 and/or the obtaining updating period of the pre-storing unit 250.

In an embodiment implemented by the invention, the load updating unit 240 may be particularly configured to:

read the cached content and update the currently loaded web page content according to a trigger of the user; or read the cached content and update the currently loaded web page content according to a preset load updating period.

The above provided web page content loading control device may be a web page browser, or other application module containing a web page browsing function. Applying the above device, after the request receiving unit 210 receives the web page access request, on the one hand, the preloading unit 220 first reads pre-stored content locally and loads the same in the foreground to guarantee a fast speed of loading; on the other hand, the caching unit 230 obtains up-to-date web page content normally in the background from the server and caches the same, and after the obtaining, the load updating unit 240 updates the currently loaded web page content at an appropriate timing. Applying the above scheme, not only the state of page loading being finished can be presented to the user rapidly, but also the updated content of a web page can be obtained automatically without being perceived by the user, and when the user wants to view the up-to-date web page content, it can also be read locally, thereby realizing an improvement on the speed of web page loading in the case of guaranteeing a timely update of the web page content.

Embodiments of the individual components of the invention may be implemented in hardware, or in a software module running on one or more processors, or in a combination thereof. It will be appreciated by those skilled in the art that, in practice, some or all of the functions of some or all of the components in a web page content loading control device according to individual embodiments of the invention may be realized using a microprocessor or a digital signal processor (DSP). The invention may also be implemented as an apparatus or a device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 5:
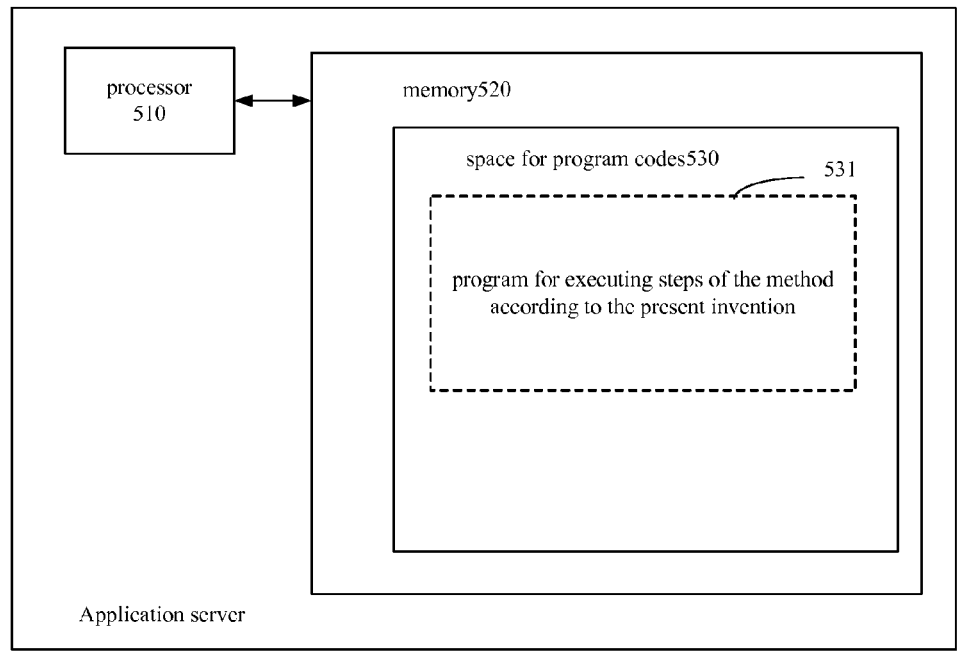
FIG. 5 shows schematically a block diagram of a server for carrying out a method according to the invention.
Figure 6:
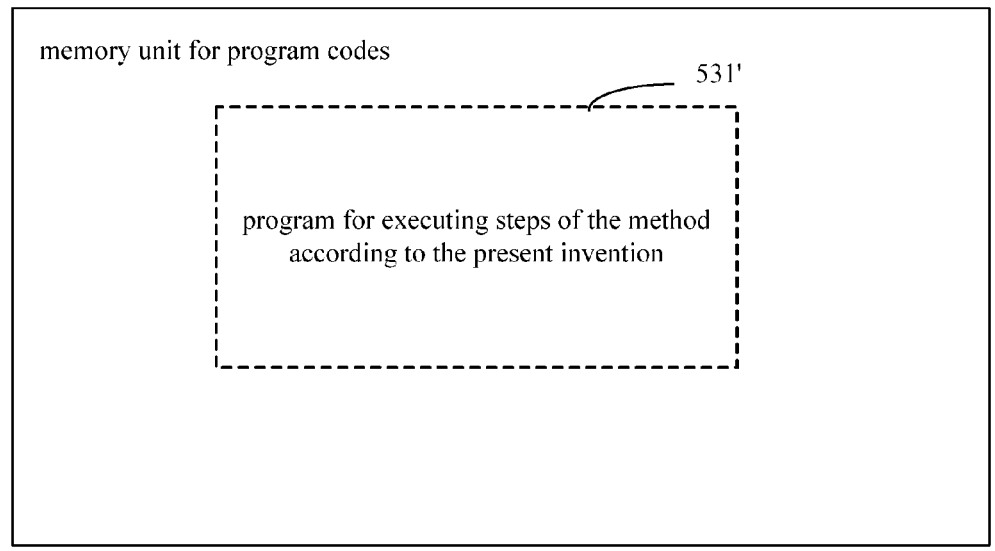
FIG. 6 shows schematically a storage unit for retaining or carrying a program code implementing a method according to the invention.

For example, FIG. 5 shows a server which may carry out a web page content loading control method according to the invention, e.g., an application server. The server traditionally comprises a processor 510 and a computer program product or a computer readable medium in the form of a memory 520. The memory 520 may be an electronic memory such as a flash memory, an EEPROM (electrically erasable programmable read-only memory), an EPROM, a hard disk or a ROM. The memory 520 has a memory space 530 for a program code 531 for carrying out any method steps in the methods as described above. For example, the memory space 530 for a program code may comprise individual program codes 531 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 6. The storage unit may have a memory segment, a memory space, etc. arranged similarly to the memory 520 in the server of FIG. 5. The program code may for example be compressed in an appropriate form. In general, the storage unit comprises a computer readable code 531', i.e., a code which may be read by e.g., a processor such as 510, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A web page content loading control method comprising:
    according to a preset object web page, obtaining web page content from a server and storing the obtained web page content locally;
    when receiving a web page access request triggered by a user, directly reading and loading the locally stored web page content according to the web page access request, wherein the locally stored web page content comprises: a picture of the locally stored web page content, a script file of the locally stored web page, or hypertext markup language (HTML) code of the locally stored web page;
    after the locally stored web page content is read and loaded, according to the web page access request, obtaining latest web page content corresponding to the locally stored web page content from the server and caching the obtained latest web page content locally; and
    after obtaining the latest web page content completely or partially, reading the cached latest web page content and updating currently loaded web page content;
    wherein, the obtaining web page content from the server comprises:

according to historical behaviors of the user browsing the web page, determining an updating period, and obtaining newer web page content periodically from the server according to the updating period; or obtaining newer web page content from the server when a storage time of the web page content exceeds a preset threshold.

2. The method as claimed in claim 1, wherein the reading the cached latest web page content and updating the currently loaded web page content comprises:

reading the cached latest web page content and updating the currently loaded web page content according to a trigger of the user; or reading the cached latest web page content and updating the currently loaded web page content according to a preset load updating period.

3. A web page content loading control device comprising:
a memory having instructions stored thereon;
a processor to execute the instructions to perform operations comprising:
according to a preset object web page, obtaining web page content from a server and storing the obtained web page content locally;
when receiving a web page access request triggered by a user, directly reading and loading the locally stored web page content according to the web page access request, wherein the locally stored web page content comprises: a picture of the locally stored web page content, a script file of the locally stored web page, or hypertext markup language (HTML) code of the locally stored web page;
after the locally stored web page content is read and loaded, according to the web page access request, obtaining latest web page content corresponding to the locally stored web page content from the server and caching the obtained latest web page content locally; and
after obtaining the latest web page content completely or partially, reading the cached latest web page content and updating currently loaded web page content;
wherein, the obtaining web page content from the server comprises:
according to historical behaviors of the user browsing the web page, determining an updating period, and obtaining newer web page content periodically from the server according to the updating period; and obtaining newer web page content from the server when a storage time of the web page content exceeds a preset threshold.

4. The device as claimed in claim 3, wherein the reading the cached latest web page content and updating the currently loaded web page content comprises:

reading the cached latest web page content and updating the currently loaded web page content according to a trigger of the user; or reading the cached latest web page content and updating the currently loaded web page content according to a preset load updating period.

5. A non-transitory computer-readable storage medium, having instructions stored thereon that, when executed by a computing device cause the device to perform web page content loading control operations, the operations comprising:

according to a preset object web page, obtaining web page content from a server and storing the obtained web page content locally;

when receiving a web page access request triggered by a user, directly reading and loading the locally stored web page content according to the web page access request, wherein the locally stored web page content comprises: a picture of the locally stored web page content, a script file of the locally stored web page, or hypertext markup language (HTML) code of the locally stored web page;

after the locally stored web page content is read and loaded, according to the web page access request, obtaining latest web page content corresponding to the locally stored web page content from the server and caching the obtained latest web page content locally; and after obtaining the latest web page content completely or partially, reading the cached latest web page content and updating currently loaded web page content;

wherein, the obtaining web page content from the server comprises:

according to historical behaviors of the user browsing the web page, determining an updating period, and obtaining newer web page content periodically from the server according to the updating period; and obtaining newer web page content from the server when a storage time of the web page content exceeds a preset threshold.

* * * * *